(12) United States Patent
Wang

(10) Patent No.: US 12,377,302 B2
(45) Date of Patent: Aug. 5, 2025

(54) FITNESS PULL DEVICE

(71) Applicant: Xingxing Wang, Zhejiang (CN)

(72) Inventor: Xingxing Wang, Zhejiang (CN)

(73) Assignee: HANGZHOU YUSHU TECHNOLOGY CO., LTD., Zhejiang (CN)

( * ) Notice: Subject to any disclaimer, the term of this patent is extended or adjusted under 35 U.S.C. 154(b) by 530 days.

(21) Appl. No.: 17/640,254

(22) PCT Filed: Jul. 23, 2020

(86) PCT No.: PCT/CN2020/103718
§ 371 (c)(1),
(2) Date: Mar. 3, 2022

(87) PCT Pub. No.: WO2020/253888
PCT Pub. Date: Dec. 24, 2020

(65) Prior Publication Data
US 2022/0305320 A1    Sep. 29, 2022

(30) Foreign Application Priority Data

Jun. 17, 2019  (CN) .......................... 201920905356.8

(51) Int. Cl.
*A63B 21/005* (2006.01)
*A63B 21/00* (2006.01)
(Continued)

(52) U.S. Cl.
CPC ...... *A63B 21/0054* (2015.10); *A63B 21/0058* (2013.01); *A63B 21/153* (2013.01); *H02K 7/106* (2013.01); *A63B 2024/0093* (2013.01)

(58) Field of Classification Search
CPC ............ A63B 21/0054; A63B 21/0058; A63B 21/153; A63B 2024/0093; A63B 2225/20;
(Continued)

(56) References Cited

U.S. PATENT DOCUMENTS 5,304,104 A * 4/1994 Chi ....................... A63B 21/153
482/99
6,280,361 B1 * 8/2001 Harvey .................. A63B 24/00
482/4
(Continued)

FOREIGN PATENT DOCUMENTS

CN      102294106 A    12/2011
CN      204233664 U    4/2015
(Continued)

*Primary Examiner* — Joshua Lee
*Assistant Examiner* — Catrina A Letterman
(74) *Attorney, Agent, or Firm* — Muncy, Geissler, Olds & Lowe, P.C.

(57) ABSTRACT

A fitness pull device includes a torque-controllable motor and a pull mechanism. The pull mechanism includes a housing which covers the motor, a motor base fixed in an inner cavity of the housing, a winding piece rotatably connected to an output shaft of the motor, and a rope wound on the winding piece. The motor transfers torque required by a user to the rope on the winding piece, so that the size of the force is changed according to the actual usage requirements of the user. The motor acts as a force generation apparatus, and the controllability of the existing torque of the motor is used in combination with the pull device structure such that the size of the force can be changed according to the actual usage requirements of the user, in order to enrich the user fitness experience, and achieve a better effect.

18 Claims, 2 Drawing Sheets

(51) Int. Cl.
*A63B 24/00* (2006.01)
*H02K 7/106* (2006.01)

(58) Field of Classification Search
CPC ........ A63B 2071/0683; A63B 2225/50; A63B 24/0087; A63B 21/15–157; H02K 7/106; H02K 7/116
See application file for complete search history.

(56) References Cited

U.S. PATENT DOCUMENTS

| | | | |
|---|---|---|---|
| 10,220,261 B1 * | 3/2019 | Garsdean | A63B 24/0087 |
| 2008/0157637 A1 * | 7/2008 | Bulthaup | H02K 7/1853 |
| | | | 310/75 R |
| 2014/0113779 A1 * | 4/2014 | Loach | A63B 21/00069 |
| | | | 310/105 |
| 2016/0101322 A1 | 4/2016 | Potter et al. | |
| 2019/0099652 A1 * | 4/2019 | Orady | A63B 21/4043 |
| 2019/0344123 A1 * | 11/2019 | Rubin | A63B 69/0057 |
| 2021/0220703 A1 * | 7/2021 | Lee | A63B 21/153 |

FOREIGN PATENT DOCUMENTS

| | | | | |
|---|---|---|---|---|
| CN | 108654011 A | 10/2018 | | |
| CN | 109260670 A | 1/2019 | | |
| CN | 210447950 U | 5/2020 | | |
| EP | 4252867 A1 * | 10/2023 | ......... | A63B 21/0059 |
| WO | WO-2018/096370 A1 | 5/2018 | | |

* cited by examiner

FITNESS PULL DEVICE

TECHNICAL FIELD

The utility model relates to a fitness pull device, pertaining to the field of fitness devices.

BACKGROUND

In the new era, the general public are beginning to pursue a healthier and more fulfilling lifestyle. Accordingly, public fitness and everyone fitness are becoming a trend. At present, the most conventional fitness equipment includes strength training devices, such as dumbbells, chest developer s, and barbells.

BRIEF SUMMARY

Technical Problems

In terms of fitness with dumbbells, a user achieves the purpose of muscle training by overcoming the weight of the dumbbells. Dumbbells are generally bulky and inconvenient to carry, resulting in poor user experience. Alternatively, when the user uses an elastic pull rope for fitness, due to the fact that external force for fitness is provided for the user by means of deformation of an elastic material, the acting form of the force is not friendly. Specifically, the required pulling force is smaller at the beginning of the deformation, but the force needs multiply as the deformation increases, thereby making it very difficult to control the size of the force to the extent desired by the user in actual use.

Solution of Problems

Technical Solution

In view of the defects in the prior art, the utility model aims to provide a fitness pull device, in which a motor acts as a force generation apparatus, and the controllability of the existing motor torque is used in combination with a pull device structure such that the size of the force can be changed according to the actual usage requirements of a user, in order to enrich the user fitness experience, and achieve a better effect. The structure of the fitness pull device is lightweight and portable, which is convenient for carry in travel.

In order to achieve the above purpose, the technical solution of the utility model is as follows:

a fitness pull device, including a torque-controllable motor and a pull mechanism.

The pull mechanism includes a housing which covers the motor, a motor base fixed in an inner cavity of the housing, a winding piece rotatably connected to an output shaft of the motor, and a rope wound on the winding piece.

A stator end of the motor is fixed to the motor base, the housing is provided with a wire hole through which the rope passes, and the position of the wire hole matches the mounting position of the winding piece.

The motor transfers torque required by a user to the rope on the winding piece, so that the size of the force is changed according to the actual usage requirements of the user.

In the utility model, the motor acts as a force generation apparatus, and the controllability of the existing motor torque is used in combination with the pull device structure such that the size of the force can be changed according to the actual usage requirements of the user, in order to enrich the user fitness experience, and achieve a better effect. The structure of the utility model is lightweight and portable, which is convenient for carry in travel.

Further, the rope may be a rope with a variety of cross-sectional shapes, including but not limited to circular and square cross sections. The rope is provided with a pull ring at a user holding end, which is convenient for the user to use.

As a preferred technical measure, the motor is a brushless motor or a permanent magnet synchronous motor, and a side portion of a rotor of the motor is equipped with an encoder for determining rotor end position information of the motor in real time, so as to control the motor and determine the length position of the rope currently pulled by the user.

As a preferred technical measure, the motor is provided with a circuit board capable of controlling output torque of the motor in real time according to rotation angle information of the winding piece. The torque of the motor controlled by the circuit board can be adjusted in real time according to the actual rotation angle and speed of the winding piece, and a planned fitness pull curve. The torque of the motor is changed according to the training characteristics of human muscles, so as to improve the training effect as much as possible.

The circuit board can control the motor to automatically start to work without an additional switch when the user pulls the winding piece to rotate, and to automatically shut down or sleep when not being used by the user for a long time.

As a preferred technical measure, the circuit board for controlling the output torque of the motor is connected to the encoder, and is used for receiving rotation information of the motor in real time.

As a preferred technical measure, the motor drives, by means of a reducer, the winding piece to be rotatably connected, and the reducer includes a planetary reducer and a fixed frame; an end portion of the fixed frame is fixedly connected to the motor base, to form a space for mounting the planetary reducer and the winding piece; and the output shaft of the motor is fixedly connected to a sun gear of the planetary reducer. Therefore, the utility model is compact in structure, small in size, and convenient to carry.

As a preferred technical measure, the winding piece has a concave revolving structure for accommodating the rope; and the winding piece is integrated with or fixedly connected to an output planet carrier of the planetary reducer. Therefore, the utility model is compact in structure and small in size.

As a preferred technical measure, an outer end face of the housing is provided with a buckle and/or a bolt hole for fixing to other devices. The buckle is used for connecting to a rope-like object, for example, for a rope strap to pass through. The bolt hole is used for directly fixing the utility model to an external object, such as a wall, with a bolt.

As a preferred technical measure, the fitness pull device further includes a data recording module for recording a usage status of the user, and a wireless communication module for connecting to a mobile phone and/or a computer and/or a cloud server of the user. The data recording module can record various pieces of data in real time when the current user uses the fitness pull device. The various pieces of data include but are not limited to the size of a real-time pulling force of the user, a real-time pulling speed of the user, and a real-time pulling length position of the user, so as to facilitate statistics collection for the fitness effect of the user. A corresponding application on the mobile phone of the user can send various pieces of data to the utility model, including but not limited to various force curves for strength training, switch-on/off and sleep commands, and vocalizing commands. The corresponding application on the mobile phone of the user can receive various pieces of data collected by the data recording module, including but not limited to an actual training curve of the user and current battery information.

As a preferred technical measure, the motor is provided with a feedback brake module; when the winding piece rotates under the force of the rope to drive the motor to rotate, the feedback brake module enables the motor to be in a power generation state to generate electric energy which can charge a battery or supply power to the outside; and the feedback brake module is built in the circuit board. When the user pulls the utility model, excess electric energy generated by power generation when the user pulls the motor for work can be collected for charging the battery of the utility model or supplying power to the outside, so as to save the consumption of the electric energy. The utility model is simple in structure, practical, rich in functions, and easy to popularize.

As a preferred technical measure, the housing is provided with a first casing and a second casing with cavities; the first casing engages with the second casing along the axial extension direction of an output shaft of the motor; the housing is formed by the two casings engaging with each other, thereby facilitating production and manufacturing, reducing the manufacturing difficulty, and reducing the production cost; the two casings engage with each other along the axial extension direction of the output shaft, thereby facilitating mounting of the motor and the casing, that is, the motor is put into one casing firstly, and then the other casing engages with the former casing. Therefore, the structure is simple and practical, and the solution is feasible.

The first casing and the second casing each have an arc-shaped structure and a planar structure; the arc-shaped structure can fit the motor to the greatest extent, thereby making the utility model compact and attractive in structure; and the planar structure facilitates mounting of other components and parts, such as a battery.

The battery is arranged in the housing. The utility model is equipped with the rechargeable battery, so that the utility model can be used independently. Alternatively, the utility model can also be used with an external power source so as to work for a long time without charging. With a relatively small size and force magnitude, the utility model equipped with the rechargeable battery can be used independently, or can be used while being charged by the external power source. The utility model with a relatively large size and force magnitude is generally powered by the external power source.

Beneficial Effects of the Present Invention

Beneficial Effects

In the utility model, the motor acts as a force generation apparatus, and the controllability of the existing motor torque is used in combination with the pull device structure such that the size of the force can be changed according to the actual usage requirements of the user, in order to enrich the user fitness experience, and achieve a better effect. The structure of the utility model is lightweight and portable, which is convenient for carry in travel.

Figure 1:
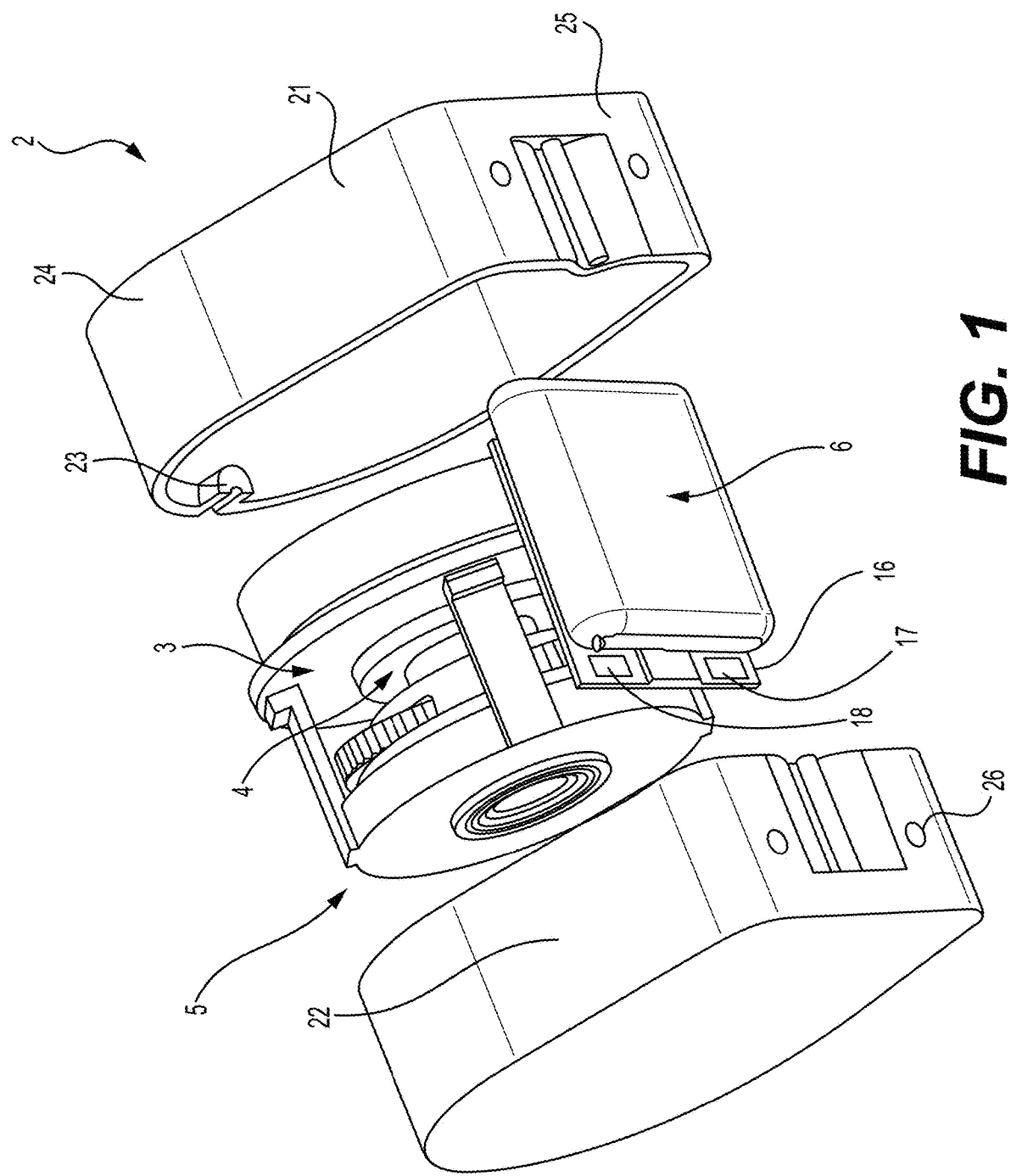
FIG. 1 is an exploded diagram of a partial structural of the utility model.

Description of reference numerals: 1, motor; 11, output shaft; 12, stator end; 2, housing; 21, first casing; 22, second casing; 23, wire hole; 24, arc-shaped structure; 25, planar structure; 3, motor base; 4, winding piece; 41, concave revolving structure; 5, reducer; 51, fixed frame; 6, battery.

IMPLEMENTATION OF THE UTILITY MODEL

In order to make the purpose, technical solutions, and advantages of the utility model clearer, the utility model will be further described below in conjunction with the accompanying drawings and embodiments. It should be understood that the specific embodiments described herein are only used to explain the utility model, but are not intended to limit the utility model.

On the contrary, the utility model covers any alternatives, modifications, equivalent methods and solutions defined by the claims within the spirit and scope of the utility model. Further, in order to enable the public to have a better understanding of the utility model, some specific details are described in detail in the following detailed description of the utility model. Those skilled in the art can fully understand the utility model without the description of these details.

It should be noted that when two elements are "fixedly connected" or "rotatably connected", the two elements may be directly connected or be connected via an intermediate element. On the contrary, when an element is referred to as being "directly on" another element, there is no intermediate element.

Unless otherwise defined, all technical and scientific terms used herein have the same meanings as those commonly understood by those skilled in the technical field of the utility model. The terms used herein are only for the purpose of describing specific embodiments, and are not intended to limit the utility model. The term "and/or" as used herein includes any and all combinations of one or more related listed items.

Figure 2:
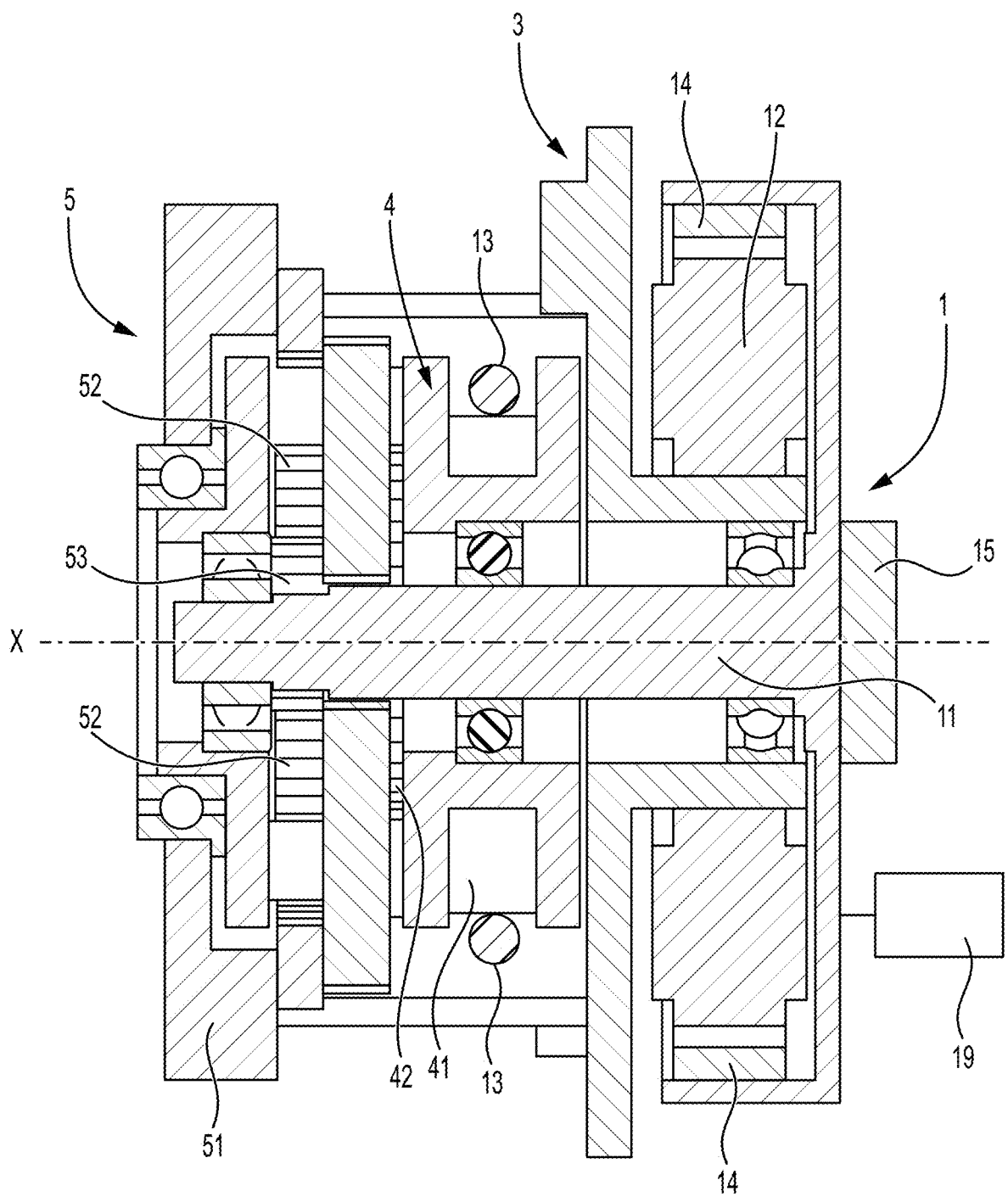
FIG. 2 is a section view of a partial structural of the utility model.

As shown in FIGS. 1-2, a fitness pull device includes a torque-controllable motor and a pull mechanism, wherein the pull mechanism includes a housing 2 which covers the motor 1, a motor base 3 fixed in an inner cavity of the housing 2, a winding piece 4 rotatably connected to an output shaft 11 of the motor 1, and a rope 13 wound on the winding piece 4.

A stator end 12 of the motor 1 is fixed to the motor base 3, the housing 2 is provided with a wire hole 23 through which the rope 13 passes, and the position of the wire hole 23 matches the mounting position of the winding piece 4.

The motor 1 is a brushless motor or a permanent magnet synchronous motor, and a side portion of a rotor 14 of the motor 1 is equipped with an encoder 15 for determining rotor end position information of the motor 1 in real time, so as to control the motor 1 and determine the length position of the rope 13 currently pulled by the user.

In the utility model, the motor 1 acts as a force generation apparatus, and the controllability of the existing torque of the motor 1 is used in combination with the pull device structure such that the size of the force can be changed according to the actual usage requirements of the user, in order to enrich the user fitness experience, and achieve a better effect. The structure of the utility model is lightweight and portable, which is convenient for carry in travel.

Further, the rope 13 may be a rope with a variety of cross-sectional shapes, including but not limited to circular and square cross sections. The rope 13 is provided with a pull ring at a user holding end, which is convenient for the user to use.

A specific embodiment of the motor 1 of the utility model:

The motor 1 is a brushless motor or a permanent magnet synchronous motor, and a side portion of a rotor 16 of the motor 1 is equipped with an encoder 15 for determining rotor end position information of the motor 1 in real time, so as to control the motor 1 and determine the length position of the rope 13 currently pulled by the user.

A specific embodiment of the circuit board of the utility model: the motor 1 is provided with a circuit board 16 capable of controlling output torque of the motor 1 in real time according to rotation angle information of the winding piece 4. The torque of the motor 1 controlled by the circuit board 16 can be adjusted in real time according to the actual rotation angle and speed of the winding piece 4, and a planned fitness pull curve. The torque of the motor 1 is changed according to the training characteristics of human muscles, so as to improve the training effect as much as possible.

The circuit board 16 can control the motor 1 to automatically start to work without an additional switch when the user pulls the winding piece 4 to rotate, and to automatically shut down or sleep when not being used by the user for a long time.

The circuit board 16 for controlling the output torque of the motor 1 is connected to the encoder 15, and is used for receiving rotation information of the motor 1 in real time.

A specific embodiment of a reducer 5 added in the utility model: the motor 1 drives, by means of the reducer 5, the winding piece 4 to be rotatably connected, and the reducer 5 includes a planetary reducer 52 and a fixed frame 51; an end portion of the fixed frame 51 is fixedly connected to the motor base 3, to form a space for mounting the planetary reducer 52 and the winding piece 4; and the output shaft 11 of the motor 1 is fixedly connected to a sun gear 53 of the planetary reducer 52. Therefore, the utility model is compact in structure, small in size, and convenient to carry.

A specific embodiment of the winding piece 4 of the utility model: the winding piece 4 has a concave revolving structure 41 for accommodating the rope 13; and the winding piece 4 is integrated with or fixedly connected to an output planet carrier 42 of the planetary reducer. Therefore, the utility model is compact in structure and small in size. A specific embodiment of the housing 2 of the utility model:

An outer end face of the housing 2 is provided with a buckle and/or a bolt hole 26 for fixing to other devices. The buckle is used for connecting to a rope-like object, for example, for a rope strap to pass through. The bolt hole 26 is used for directly fixing the utility model to an external object, such as a wall, with a bolt.

The housing 2 is provided with a first casing 21 and a second casing 22 with cavities; the first casing 21 engages with the second casing 22 along the axial extension direction X of the output shaft 11 of the motor 1; the first casing and the second casing each have an arc-shaped structure 24 and a planar structure 25; and a battery 6 is arranged in the housing 2. The utility model is equipped with the rechargeable battery 6, so that the utility model can be used independently. Alternatively, the utility model can also be used with an external power source so as to work for a long time without charging. With a relatively small size and force magnitude, the utility model equipped with the rechargeable battery 6 can be used independently, or can be used while being charged by the external power source. The utility model with a relatively large size and force magnitude is generally powered by the external power source.

A specific embodiment of a data recording module 17 and a wireless communication module added 18 in the utility model:

The fitness pull device further includes a data recording module 17 for recording a usage status of the user, and a wireless communication module 18 for connecting to a mobile phone and/or a computer and/or a cloud server of the user. The wireless communication module 18 may be a wireless communication module such as Bluetooth built in the motor 1 so as to realize the connection with the mobile phone of the user. Or in a gym, the wireless communication function can use the communication module such as Bluetooth or WiFi built in the motor 1 to realize the connection with a gym host, thereby facilitating the unified internal management of the fitness devices of the utility model in the gym.

A specific embodiment of a power generation module provided in the utility model:

The motor 1 is provided with a feedback brake module 19; when the winding piece 4 rotates under the force of the rope 13 to drive the motor 1 to rotate, the feedback brake module 19 enables the motor 1 to be in a power generation state to generate electric energy which can charge the battery 6 or supply power to the outside; and the feedback brake module 19 is built in the circuit board. When the user pulls the utility model, excess electric energy generated by power generation when the user pulls the motor for work can be collected for charging the battery of the utility model or supplying power to the outside, so as to save the consumption of the electric energy. The utility model is simple in structure, practical, rich in functions, and easy to popularize.

In the present application, the fixed connection or fixed connection mode may be screw connection or welding or riveting or inserting, or connection achieved via a third component, which can be selected by those skilled in the art according to the actual situation.

The preferred embodiments of the utility model are described above and are not intended to limit the utility model. Any modification, equivalent replacement, and improvement made within the spirit and principles of the utility model shall be included in the protection scope of the utility model.

What is claimed is:

1. A fitness pull device, comprising a torque-controllable motor and a pull mechanism, wherein the motor has an output shaft and a stator end;

the pull mechanism comprises a housing which covers the motor, a motor base fixed in an inner cavity of the housing, a winding piece rotatably provided on the output shaft of the motor so as to rotate about an axis of the output shaft, and a rope wound on the winding piece;

the stator end of the motor is fixed to the motor base, the housing is provided with a wire hole through which the rope passes, and the position of the wire hole matches a mounting position of the winding piece; and the motor is configured to transfer torque to the rope on the winding piece, so that a size of the force is configured to be changed according to actual usage requirements of the user, the motor drives, by means of a reducer, the winding piece, and the reducer comprises a planetary reducer and a fixed frame, an end portion of the fixed frame is fixedly connected to the motor base, with a space for mounting the planetary reducer, the winding piece is positioned between the planetary reducer and the motor base, the output shaft of the motor is fixedly connected to a sun gear of the planetary reducer, and the winding piece is integrated with or fixedly connected to an output planet carrier of the planetary reducer.

2. The fitness pull device according to claim 1, wherein the motor is a brushless motor or a permanent magnet synchronous motor, and a side portion of a rotor of the motor is equipped with an encoder for determining a rotor end position of the motor in real time.

3. The fitness pull device according to claim 2, wherein the motor is provided with a circuit board capable of controlling output torque of the motor in real time according to rotation angle information of the winding piece.

4. The fitness pull device according to claim 3, wherein the circuit board for controlling the output torque of the motor is connected to the encoder.

5. The fitness pull device according to claim 1, wherein the winding piece has a concave revolving structure for accommodating the rope.

6. The fitness pull device according to claim 5, further comprising a wireless communication module for connecting to a mobile phone and/or a computer and/or a cloud server.

7. The fitness pull device according to claim 6, when the winding piece rotates under the force of the rope to drive the motor to rotate, the motor is configured to be in a power generation state to generate electric energy which can charge a battery or supply power to the outside.

8. The fitness pull device according to claim 7, wherein the housing is provided with a first casing and a second casing with cavities; the first casing engages with the second casing along an axial extension direction of the output shaft of the motor; the first casing and the second casing each have an arc-shaped structure and a planar structure; and the battery is arranged in the housing.

9. The fitness pull device according to claim 1, wherein an outer end surface of the housing is provided with a bolt hole.

10. The fitness pull device according to claim 9, further comprising a wireless communication module for connecting to a mobile phone and/or a computer and/or a cloud server.

11. The fitness pull device according to claim 10, wherein when the winding piece rotates under the force of the rope to drive the motor to rotate, the motor is configured to be in a power generation state to generate electric energy which can charge a battery or supply power to the outside.

12. The fitness pull device according to claim 11, wherein the housing is provided with a first casing and a second casing with cavities; the first casing engages with the second casing along an axial extension direction of the output shaft of the motor; the first casing and the second casing each have an arc-shaped structure and a planar structure; and the battery is arranged in the housing.

13. The fitness pull device according to claim 1, further comprising a wireless communication module for connecting to a mobile phone and/or a computer and/or a cloud server.

14. The fitness pull device according to claim 13, when the winding piece rotates under the force of the rope to drive the motor to rotate, the motor is configured to be in a power generation state to generate electric energy which can charge a battery or supply power to the outside.

15. The fitness pull device according to claim 14, wherein the housing is provided with a first casing and a second casing with cavities; the first casing engages with the second casing along an axial extension direction of the output shaft of the motor; the first casing and the second casing each have an arc-shaped structure and a planar structure; and the battery is arranged in the housing.

16. The fitness pull device according to claim 1, further comprising a wireless communication module for connecting to a mobile phone and/or a computer and/or a cloud server.

17. The fitness pull device according to claim 16, wherein when the winding piece rotates under the force of the rope to drive the motor to rotate, the motor is configured to be in a power generation state to generate electric energy which can charge a battery or supply power to the outside.

18. The fitness pull device according to claim 17, wherein the housing is provided with a first casing and a second casing with cavities; the first casing engages with the second casing along an axial extension direction of the output shaft of the motor; the first casing and the second casing each have an arc-shaped structure and a planar structure; and the battery is arranged in the housing.

* * * * *